United States Patent [19]
Goodwin et al.

[11] Patent Number: 5,580,627
[45] Date of Patent: Dec. 3, 1996

[54] MOLDED PRODUCTS MADE FROM PREFORMS OF TUBULAR BRAIDS

[76] Inventors: Stephen L. Goodwin, 45 Green St., Wrentham, Mass. 02093; Randal W. Spencer, 106 Lloyd Ave., Providence, R.I. 02906

[21] Appl. No.: 170,116

[22] Filed: Dec. 20, 1993

[51] Int. Cl.⁶ ................................. B29D 22/00
[52] U.S. Cl. ................... 428/36.3; 87/9; 87/34; 428/36.1; 428/107; 428/109
[58] Field of Search ................. 428/36.1, 36.3, 428/113, 107, 109; 156/148, 149, 172; 87/9, 34

[56] References Cited

U.S. PATENT DOCUMENTS

| | | | |
|---|---|---|---|
| 3,633,629 | 1/1972 | Rider | 138/127 |
| 4,104,098 | 8/1978 | Hush et al. | 156/149 |
| 4,389,269 | 6/1983 | Cooper et al. | 156/172 |
| 4,871,491 | 10/1989 | McMahon et al. | 264/29.2 |
| 4,983,430 | 1/1991 | Sargent | 428/34.1 |
| 5,000,807 | 3/1991 | Stuart et al. | 156/166 |
| 5,176,868 | 1/1993 | Davis | 264/257 |
| 5,188,872 | 2/1993 | Quigley | 428/36.2 |

OTHER PUBLICATIONS

"Fabrication Techniques of Tubular Structures from Braided Preimpregnated Rovings," Soceity of Manufacturing Engineers, technical Paper EM85–100 (1985).

*Primary Examiner*—James J. Bell
*Attorney, Agent, or Firm*—Fish & Richardson P.C.

[57] ABSTRACT

A method of making a product including continuously feeding an elongated flexible tubular bladder, and braiding a first ply of a tubular braid of first yarns including reinforcing fibers and moldable material on the bladder, the tubular bladder having sufficiently high temperature degradation characteristics with respect to a molding processing temperature of the material such that the bladder maintains its structural integrity when the material is molded thereon.

17 Claims, 1 Drawing Sheet

MOLDED PRODUCTS MADE FROM PREFORMS OF TUBULAR BRAIDS

BACKGROUND OF THE INVENTION

The invention relates to molded products made from preforms of tubular braids, e.g., tennis rackets made from commingled carbon and thermoplastic yarns.

Tennis racket frames have been made by braiding a tubular braid of carbon reinforcing filaments impregnated with thermoset resin, inserting a bladder within the tubular braid, loading the tubular braid and bladder in a mold, and heating the mold while the internal bladder is inflated to cause curing of the resin around the reinforcing fibers. After molding the bladder is removed.

Davis U.S. Pat. No. 5,176,868 describes using the same procedure to make tennis racquet frames from a tubular braid of a yarn of commingled continuous carbon fibers and thermoplastic fibers, a type of yarn described in McMahon et al. U.S. Pat. No. 4,871,491 and Stuart U.S. Pat. No. 5,000,807.

SUMMARY OF THE INVENTION

In one aspect, the invention features, in general, making preforms for use in making molded products by continuously feeding an elongated, flexible tubular bladder into a braiding machine and braiding a tubular braid of yarns, including reinforcing fibers and moldable material, around the bladder. The tubular bladder has sufficiently high temperature degradation characteristics with respect to the molding processing temperature of the moldable material such that the bladder maintains structural integrity when it is molded. The bladder and tubular braid are cut into preforms of lengths corresponding to the lengths used in the molded product; the preforms are placed into a mold; and heat is applied to the preform in the mold while pressure is applied to inflate the bladder.

Preferably, there is an overbraid of compaction yarns over a first ply of the tubular braid; the compaction yarns tend to debulk the tubular braid. The compaction yarns are different in composition from the first yarn, for example, including only thermoplastic fibers, while the first ply includes yarns of both thermoplastic and reinforcing fibers. The compaction yarns are at a larger angle with respect to the longitudinal axis than the yarns of the first ply. The yarns of the compaction ply typically are greater than 30° (generally more than 10° greater than yarns in the first ply, most preferably about 45°) while the yarns of the first ply are preferably at an angle of less than 30° (most preferably 20°).

Preferably there is a second ply of a tubular braid that includes reinforcing fibers and moldable material. The first and second plies are made of commingled yarns of continuous reinforcing filaments (e.g., carbon) and thermoplastic filaments (e.g., nylon). The compaction ply is also made from nylon material. The compaction yarn preferably includes axial yarns of different color than the other yarns in the compaction ply, the axial yarns being at a predetermined location with respect to axial yarns in the first and second plies in order to properly locate the preform in the mold.

Other advantages and features of the invention will be apparent from the following description of the preferred embodiment thereof and from the claims.

DESCRIPTION OF THE PREFERRED EMBODIMENT

The preferred embodiment will now be described.

DRAWINGS

STRUCTURE

Figure 1:
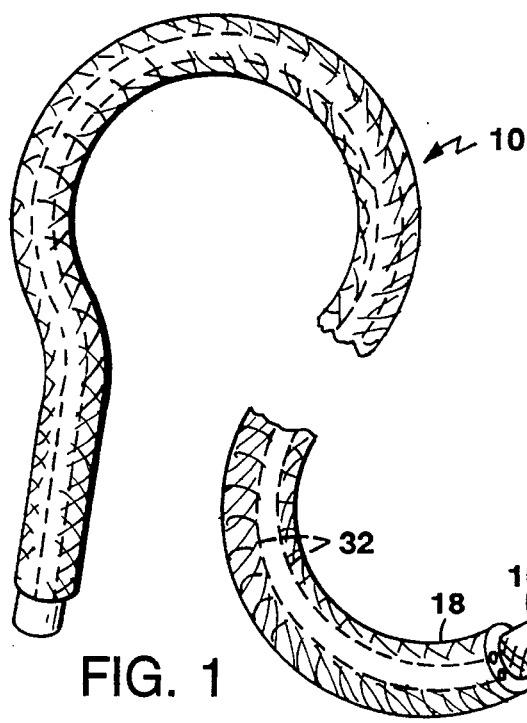
FIG. 1 is a diagrammatic perspective view of a preform of a tubular braid used to make a molded product according to the invention.

Referring to FIG. 1, there is shown preform 10. It includes elongated flexible tubular bladder 12, first ply 14 of a tubular braid, second ply 16 of tubular braid, and compaction ply 18 of a tubular braid.

Figure 5:
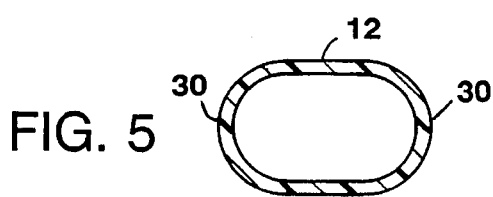
FIG. 5 is a sectional view of a tubular bladder of the FIG. 1 preform.
Figure 3:
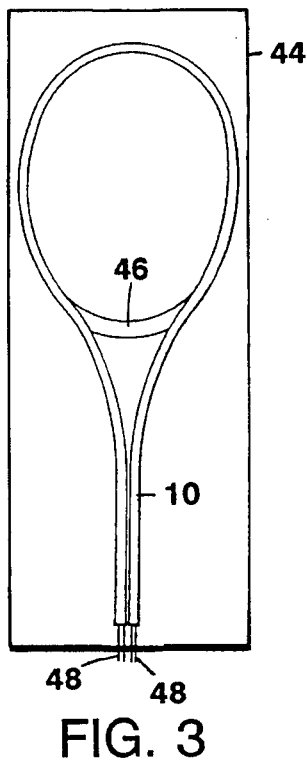
FIG. 3 is a diagrammatic plan view showing the FIG. 1 preform placed a mold.

Bladder 12 is made of 0.050" thick silicone rubber and has an oblong cross-section, as shown in FIG. 5. First and second plies 14 and 16 are made of commingled yarns having nylon and carbon in a 50/50 ratio by volume. The nylon is 1950 denier (184 filaments), and the carbon fiber is 12K carbon fiber having a standard modulus of 33,000,000 psi. The nylon has a melting temperature of 450° F., and the mold provides a processing temperature of 500° F. during molding. Silicone rubber bladder 12 does not decompose at 600° F. and maintains its structural integrity when the plies are molded thereon in the mold.

First ply 14 has 32 carrier yarns on carrier stage 22 (FIG. 2) of tubular braiding apparatus 24. There are 16 positive yarns and 16 negative yarns. There also are four axial yarns at axial stage 26 to provide axial yarns 28 on each side aligned with the narrow sides 30 of oblong cross-section bladder 12 (FIG. 5). Second ply 16 has 44 carrier yarns (22 positive and 22 negative) and four axial yarns in the same position as yarns 28.

Compaction ply 18 has 32 nylon yarns (1950 denier, 184 filaments) and four axial yarns 32 that are colored in order to locate narrow sides 30 of bladder 12. The carrier yarns of the first and second plies are at ±20° to the longitudinal axis of bladder 12. The yarns of compaction ply 18 are at ±45° to the longitudinal axis. The compaction ply typically is greater than 30° (generally more than 10° greater than yarns in the first ply), while the yarns of the first ply are preferably at an angle of less than 30°.

MANUFACTURE

Figure 2:
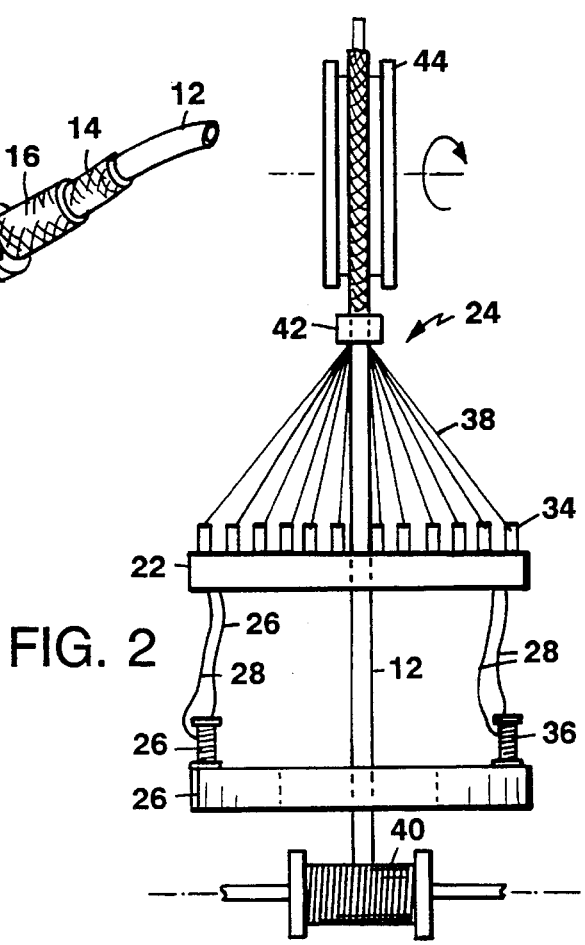
FIG. 2 is a diagrammatic view of apparatus for braiding a tubular braid over an elongated flexible bladder.
Figure 4:
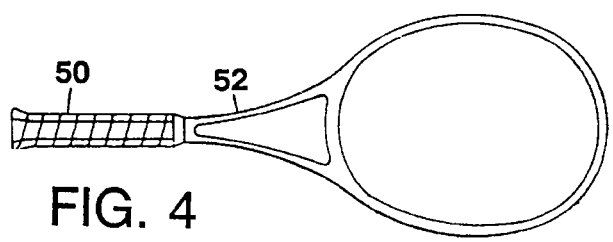
FIG. 4 is a plan view of a molded product according to the invention.

Referring to FIG. 2, tubular braiding apparatus 24 includes carrier stage 22, on which spools 34 of carrier yarns 38 travel in a serpentine fashion, as is known in the art to provide a tubular braid. Axial yarns 28 are supplied by spools 36 on axial stage 26 and pass through guide holes in carrier stage 22. Carrier yarns 38 are braided around axial yarns 28. Elongated flexible bladder 12 is fed from reel 40 through the center passages of axial stage 26 and carrier stage 22 and receives the tubular braid being formed therearound at guide 42 prior to take up on take-up reel 44. Tubular braiding apparatus 24 is, for example, available from Wardwell Braiding Machines.

In manufacture, first ply 14 is braided on about 200' of tubular bladder 12 available on reel 40, as was just described. The resulting product (bladder 12 with first ply 14 thereon) is fed through a braiding apparatus with 44 carrier spools, and second ply 16 is braided thereover. The resulting product (bladder 12 with plies 14 and 16) is fed through braiding apparatus 24 with 32 nylon carrier yarns on spools on carrier stage 22 and spools of colored axial yarns at axial stage 26. During all three braiding processes, the axial yarns are provided at narrow sides 30 of bladder 12 in order to provide additional reinforcement at these locations. The resulting product can be rolled on a reel and shipped or stored, or it can be cut into lengths of preforms 10, and shipped or stored in that form.

To make a molded product, preform 10 is packed into mold 44. Colored, axial yarns 32 in compaction ply 18 are used to guarantee proper positioning of the narrow sides of preform 10 and the axial yarns in first and second plies 14, 16.

Crosspiece 46 is also placed in mold 44. This includes a tubular braid with an expandable foam core in place of bladder 12. The expandable foam used in bridge 46 is a polymethacrylimide rigid foam which is available under the Rohacell trade designation from Rohm Tech Inc., Malden, Mass. and which expands at about 350° F. Ends 48 of bladder 12 are connected to a source of pressure, and bladder 12 is inflated during molding. After molding, bladder 12 is removed. Handle 50 is provided on frame 52, and holes are drilled in the frame in order to permit stringing of the racquet.

What is claimed is:

1. A tubular braid stock preform product comprising an internal bladder made of an elongated, flexible tube, a first ply of a tubular braid of first yarns including reinforcing fibers and a moldable material on said bladder, said first ply being braided in place over said bladder, said first yarns being at a first yarn angle with respect to said longitudinal axis, said bladder having significantly high temperature degradation characteristics with respect to molding processing temperature of said material such that said bladder maintains its structural integrity when said material is molded thereon, and a compaction ply of a tubular braid of compaction yarns over said first ply, said compaction ply being braided in place over said first ply, said compaction yarns being at a larger angle with respect to said longitudinal axis that is at least 10° greater than said first yarn angle.

2. The product of claim 1 wherein said product is longer than 2.0 meters.

3. The product of claim 2 wherein said product is longer than 20 meters.

4. The product of claim 1 wherein said compaction yarns are different in composition from said first yarns.

5. The product of claim 1 wherein said compaction yarns are at a larger angle with respect to the longitudinal axis of said bladder than first yarns.

6. The product of claim 5 wherein said larger angle is greater than 30°.

7. The product of claim 6 wherein said larger angle is greater than 40°.

8. The product of claim 5 wherein said first yarns are at a first yarn angle with respect to said longitudinal axis of 30° or less, and said larger angle is at least 10° greater than said first yarn angle.

9. The product of claim 8 wherein said first yarn angle is 25° or less, and said larger angle is 40° or more.

10. The product of claim 1 further comprising a second ply of a tubular braid of second yarns including reinforcing fibers and moldable material over said first ply and under said compaction ply.

11. The product of claim 1 wherein said first yarn is a commingled yarn of continuous reinforcing filaments and thermoplastic filaments.

12. The product of claim 10 wherein said first and second yarns are commingled yarns of continuous reinforcing filaments and thermoplastic filaments.

13. The product of claim 1 wherein said tubular braid of said first ply includes axial yarns.

14. The product of claim 13 wherein said axial yarns are located at positions spaced by about 180° from each other.

15. The product of claim 10 wherein said tubular braid of second yarns includes axial yarns.

16. The product of claim 12 wherein said compaction yarn is made of the same thermoplastic material as said thermoplastic filaments in said first and second yarns.

17. The product of claim 13 wherein said tubular braid of said compaction yarn includes axial yarns of different color than other yarns in said compaction ply, said axial yarns of different color being at predetermined locations with respect to said axial yarns in said first ply.

\* \* \* \* \*